United States Patent
Urano et al.

(10) Patent No.: US 7,231,222 B2
(45) Date of Patent: Jun. 12, 2007

(54) MOBILE COMMUNICATION TERMINAL AND METHOD FOR CONTROLLING THE SAME

(75) Inventors: Tomoyuki Urano, Yokohama (JP); Hiroshi Nakamura, Anjyo (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 423 days.

(21) Appl. No.: 10/111,777

(22) PCT Filed: Mar. 8, 2001

(86) PCT No.: PCT/JP01/01829

§ 371 (c)(1), (2), (4) Date: Apr. 29, 2002

(87) PCT Pub. No.: WO01/67797

PCT Pub. Date: Sep. 13, 2001

(65) Prior Publication Data

US 2002/0155849 A1    Oct. 24, 2002

(30) Foreign Application Priority Data

Mar. 9, 2000    (JP)    ............................. 2000-065337

(51) Int. Cl.
H04Q 7/20    (2006.01)
(52) U.S. Cl. .................... 455/466; 455/418; 455/553.1
(58) Field of Classification Search ............. 455/404.2, 455/428, 466, 455, 433, 560, 459, 418, 553.1
See application file for complete search history.

(56) References Cited

U.S. PATENT DOCUMENTS 6,151,507 A * 11/2000 Laiho et al. ................ 455/466

6,539,237 B1 * 3/2003 Sayers et al. ............... 455/555

(Continued)

FOREIGN PATENT DOCUMENTS

JP    06-217037    8/1994

(Continued)

OTHER PUBLICATIONS

International Search Report dated Jun. 7, 2001.

(Continued)

*Primary Examiner*—Joseph Feild
*Assistant Examiner*—Pierre-Louis Desir
(74) *Attorney, Agent, or Firm*—Eric J. Robinson; Robinson Intellectual Law Office, P.C.

(57) ABSTRACT

A mobile communication terminal enabling the user to select or change the transmission method (bearer) during or after the edit of message data when the terminal transmits data to the party communication terminal of the same model. The mobile communication terminal has a bearer changing function of changing the bearer during or after the edit of message data and a bearer automatic judging function of automatically judging an appropriate bearer after the edit. In an embodiment, if the quantity of character data (input with keys) exceeds a predetermined value (for example 128 bytes) during the edit of message data or if a file is attached, the user is prompted to change the communication method to the DAS bearer. At the next step, if the user issues an instruction to change the bearer to the DAS bearer, the mobile communication terminal operates to make a transition to the destination setting and message data creation according to the DAS bearer.

11 Claims, 8 Drawing Sheets

U.S. PATENT DOCUMENTS 6,570,869 B1 * 5/2003 Shankar et al. ............. 370/352
6,608,832 B2 * 8/2003 Forslow ...................... 370/353
6,690,679 B1 * 2/2004 Turunen et al. ............. 370/469

FOREIGN PATENT DOCUMENTS

| JP | 10-174136 | 6/1998 |
|----|-----------|--------|
| JP | 11-168560 | 6/1999 |
| WO | WO 98/23110 | 5/1998 |
| WO | WO 9823110 A2 * | 5/1998 |
| WO | WO 99/66746 | 12/1999 |

OTHER PUBLICATIONS

*Supplementary European Search Report* and *Annex to the European Search Report*, Mar. 31, 2003.

* cited by examiner

FIG. 2
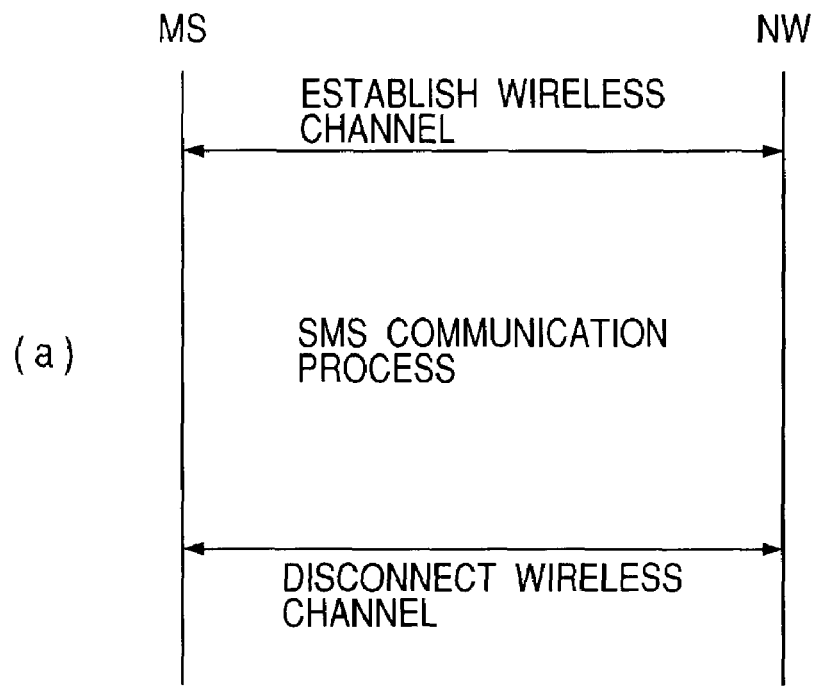
(a)
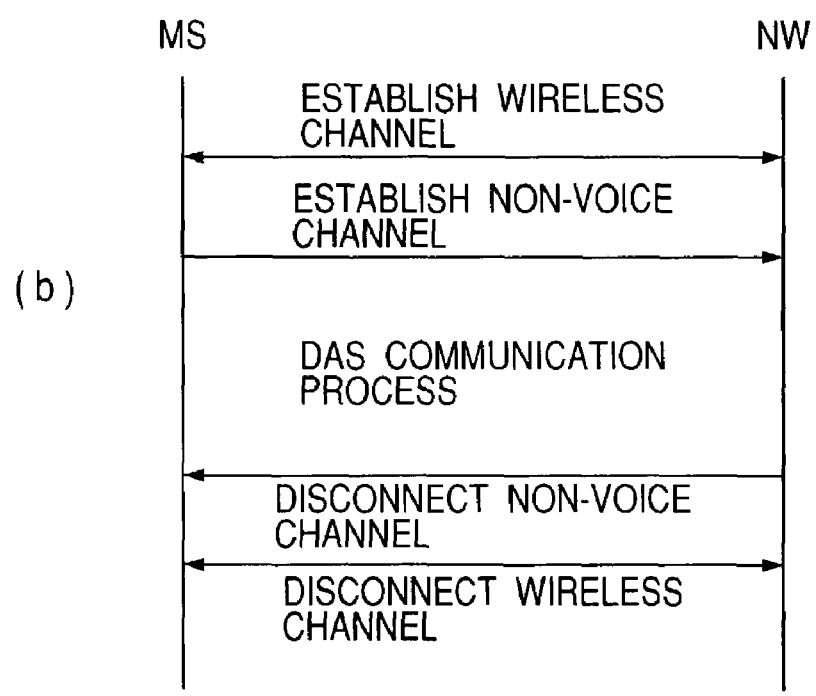
(b)

FIG. 3
(a) 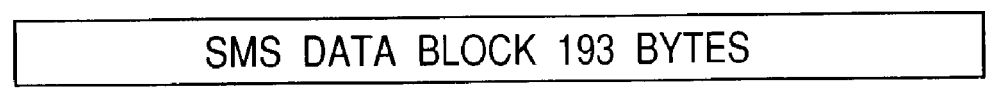
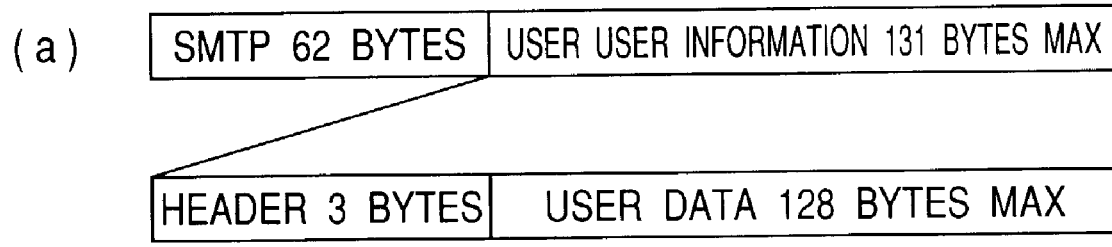
(b) 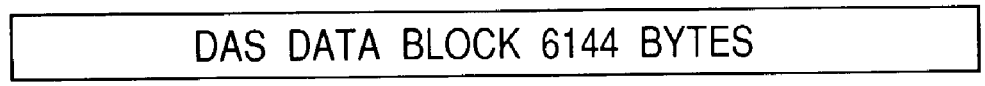
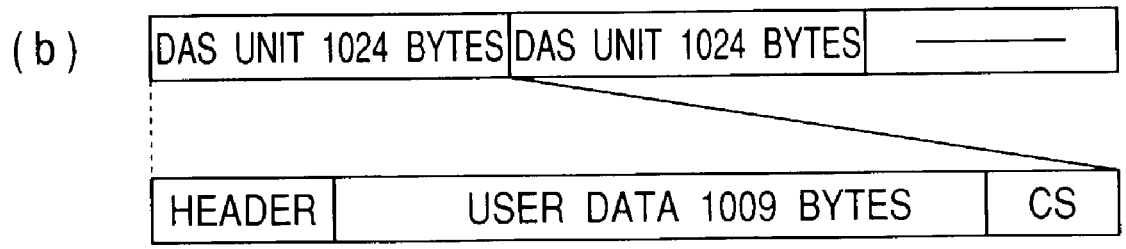

MOBILE COMMUNICATION TERMINAL AND METHOD FOR CONTROLLING THE SAME

TECHNICAL FIELD

The present invention relates to a mobile communication terminal, and more particularly to a mobile communication terminal capable of transmitting data by a plurality of transmission methods.

BACKGROUND ART

Along with recent improvements on network services and high performance of mobile communication terminals, communication terminals are prevailing which can transmit and receive data by selecting a proper communication protocol (transmission/reception method) from a plurality of communication protocols.

Under such circumstances, a mobile communication terminal proposed in JP Laid-Open Gazette No.11-136751 has the functions as shown in the block diagram of FIG. 8.

Referring to FIG. 8, a memory unit 6 has a message storage area 6a, first and second code conversion table storage areas 6b and 6c. The message storage area 6a stores a message written by predetermined text codes converted from character data input from a key input unit 63. The first code conversion table storage area 6b is used for converting character data into numerical data to be transmitted to a pager. The second code conversion table storage area 6c is used for converting character data into data to be transmitted to a PHS terminal.

A control unit 5 has a personal computer communication control means 5a, a pager call control means 5b and a mobile station message communication control means 5c. The personal computer communication control means 5a controls the transmission of character data stored in the memory unit 6 as an email. The pager call control means 5b controls the transmission of character data to a pager by converting the character data by using the first code conversion table storage area 6b. The mobile station message communication control means 5c controls the transmission of character data to a PHS terminal by converting the character data by using the second code conversion table storage area 6c.

Message data created by the mobile communication terminal is converted in accordance with the type of a communication destination terminal. The above-cited publication does not teach data conversion for terminals of the same type having a plurality of transmission methods.

A mobile communication terminal is known which has a plurality of different communication methods called "bearers" and can communicate by selectively using one of the methods.

For example, such a mobile communication terminal has two different transmission methods, an SMS bearer and a DAS bearer. FIG. 2 shows sequences of data transmission/reception services using the SMS bearer and DAS bearer.

FIG. 2(*a*) shows a sequence of the SMS bearer (Sky Walker). During an SMS communication process, a wireless channel is established between a mobile communication terminal MS and a network NW, and after the SMS communication process is completed, the wireless channel is disconnected.

FIG. 2(*b*) shows a sequence of the DAS bearer (J—Sky Walker). During a DAS communication process, a non-voice channel is established between a mobile communication terminal MS and a network NW, and after the DAS communication process is completed, the non-voice channel is disconnected.

The largest difference between the SMS and DAS bearers in terms of an NW access sequence is whether or not the non-voice channel is used. In the SMS bearer, the non-voice channel is not used, but data transmission/reception is performed by placing data on a message at the L3 level stipulated in RCR-STD27. In the DAS bearer, data transmission/reception is performed by using the non-voice channel.

The DAS bearer has a larger data size capable of transmission/reception of data of one session than that of the SMS bearer, and can attach a file. The SMS bearer can set only one message data destination site, whereas the DAS bearer can set five message data destination sites at the maximum. However, the communication cost of the DAS bearer becomes correspondingly higher than that of the SMS bearer.

A conventional mobile communication terminal is required to determine which bearer is used before the edition of message data. The bearer once determined cannot be changed during or after the edition of message data.

The length of message data is variable so that there is a high possibility that the length of message data may become longer or shorter during the edition. Therefore, for example, if the SMS bearer is selected and the length of message data becomes longer than expected and exceeds 128 bytes, then the message data once created cannot be used and it becomes necessary to create new message data.

Conversely, if the DAS bearer is selected and the length of message data becomes shorter than expected and shortens smaller than 128 bytes, then the communication cost of the higher DAS bearer fee is incurred, although the SMS bearer fee can otherwise be used.

The present invention has been made considering the technical disadvantages in the prior art as stated above, and has two main objectives.

A first objective of the present invention is to provide a mobile communication terminal capable of selecting or changing a transmission method for transmitting message data to a destination terminal of the same kind, during or after the edition of message data.

A second objective of the present invention is to provide a mobile communication terminal capable of automatically judging a transmission method for transmitting message data to a destination terminal of the same kind, after the edition of message data.

DISCLOSURE OF THE INVENTION

In order to achieve the above objectives of the present invention, there is provided a mobile communication terminal capable of transmitting message data to a partner communication terminal provided with data transmission/reception services identical or compatible/with the mobile communication terminal, by selecting any one of a plurality of transmission methods, the mobile communication terminal comprising: bearer changing means for changing a transmission method during or after edition of message data; and bearer automatic judging means for automatically judging a transmission method after the edition of message data.

In this mobile communication terminal, each of the bearer changing means and the bearer automatic judging means preferably includes means for setting valid/invalid of an operation function of each of the bearer changing means and the bearer automatic judging means.

The valid/invalid setting means may include means for registering setting of valid/invalid of the bearer changing means and the bearer automatic judging means, for each transmission partner.

The mobile communication terminal may further include means for setting or changing a destination in accordance with the transmission method selected or changed by the bearer changing means and the bearer automatic judging means, if the destination to be designated as a transmission destination of message data is different for each transmission method.

The message data is, for example, any one or a set of ones of a newly created message, a transfer message and a return message.

According to one aspect of the present invention, there is provided a control method for a mobile communication terminal having a bearer changing function and a bearer automatic judging function and being capable of transmitting message data to a partner communication terminal provided with data transmission/reception services identical or compatible/with the mobile communication terminal, by selecting any one of a plurality of transmission methods, the control method comprising: a step of monitoring whether the contents of message data during edition satisfies a transmission capability condition of the transmission method selected before the edition; a step of displaying a menu indicative of re-selection for transmission methods if it is confirmed that the transmission capability condition is not satisfied; and a step of changing a re-selected transmission method if the transmission method is re-selected, and if the transmission method is not re-selected, transferring an operation of the mobile communication terminal to a state that message data is to be edited again.

According to a second aspect of the present invention, there is provided a control method for a mobile communication terminal having a bearer changing function and a bearer automatic judging function and being capable of transmitting message data to a partner communication terminal provided with data transmission/reception services identical or compatible/with the mobile communication terminal, by selecting one of a plurality of transmission methods, the control method comprising: a step of monitoring whether the contents of message data after edition satisfies a transmission capability condition of the transmission method selected before the edition; a step of judging whether the transmission capability condition of another transmission method is satisfied, if it is judged that the transmission capability condition is satisfied; a step of displaying on a display unit a menu indicative of changeability to the other transmission method, if the transmission capability condition of the other transmission method is also satisfied; and a step of not changing the transmission method if there is no instruction to change to the other transmission method, or changing to the other transmission method if there is an instruction to change to the other transmission method.

According to a third aspect of the invention, there is provided a control method for a mobile communication terminal having a bearer changing function and a bearer automatic judging function and being capable of transmitting message data to a partner communication terminal provided with data transmission/reception services identical on compatible/with the mobile communication terminal, by selecting any one of a plurality of transmission methods, the control method comprising: a step of judging a transmission method in accordance with the contents of message data after edition of the message data; a step of displaying on a display unit a confirmation menu to cause to confirm whether the message data is transmitted by the judged transmission method; and a step of transmitting the message data by the judged transmission method if there is an instruction to transmit the message data by the judged transmission method, or if there is no instruction to transmit the message data by the judged transmission method, transferring an operation of the mobile communication terminal to a state that message data is to be edited again.

According to a fourth aspect of the invention, there is provided a control method for a mobile communication terminal having a bearer changing function and a bearer automatic judging function and being capable of transmitting message data to a partner communication terminal provided with data transmission/reception services identical or compatible/with the mobile communication terminal, by selecting any one of a plurality of transmission methods, the control method comprising: a step of judging a transmission method according to the contents of message data after edition of the message data; a step of displaying on a display unit a selection menu to cause to select either message data transmission by the judged transmission method or message data transmission by another transmission method; a step of transmitting the data by the judged transmission method if the data transmission by the judged transmission method is selected, or notifying a user of that data is transmitted by the other transmission method and that message data is to be edited again in accordance with a transmission capability condition of the other transmission method, if the data transmission by the other transmission method is selected; a step of editing the message data again in accordance with the transmission capability condition of the other transmission method; and a step of transmitted the re-edited message data.

The message data is, for example, any one or a set of ones of a newly created message, a transfer message and a return message.

The contents of the message data include, for example, a data size of the data and information concering presence/absence of a file to be attached.

BRIEF DESCRIPTION OF THE DRAWINGS

FIG. 2 shows sequences comparatively illustrating an SMS bearer and a DAS bearer.

FIG. 3 shows the formats of signals used by the SMS and DAS bearers.

EMBODIMENTS OF THE INVENTION

Figure 1:
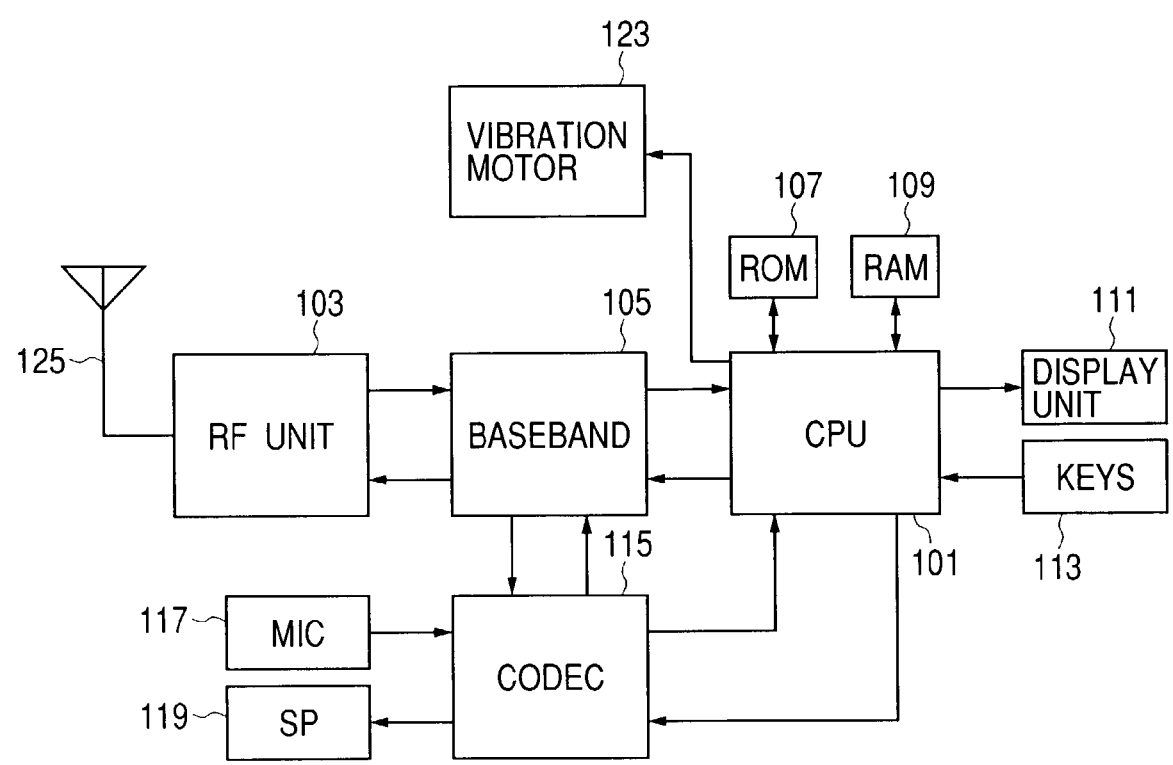
FIG. 1 is a functional block diagram showing the structure of a mobile communication terminal to be used in this invention.
Figure 4:
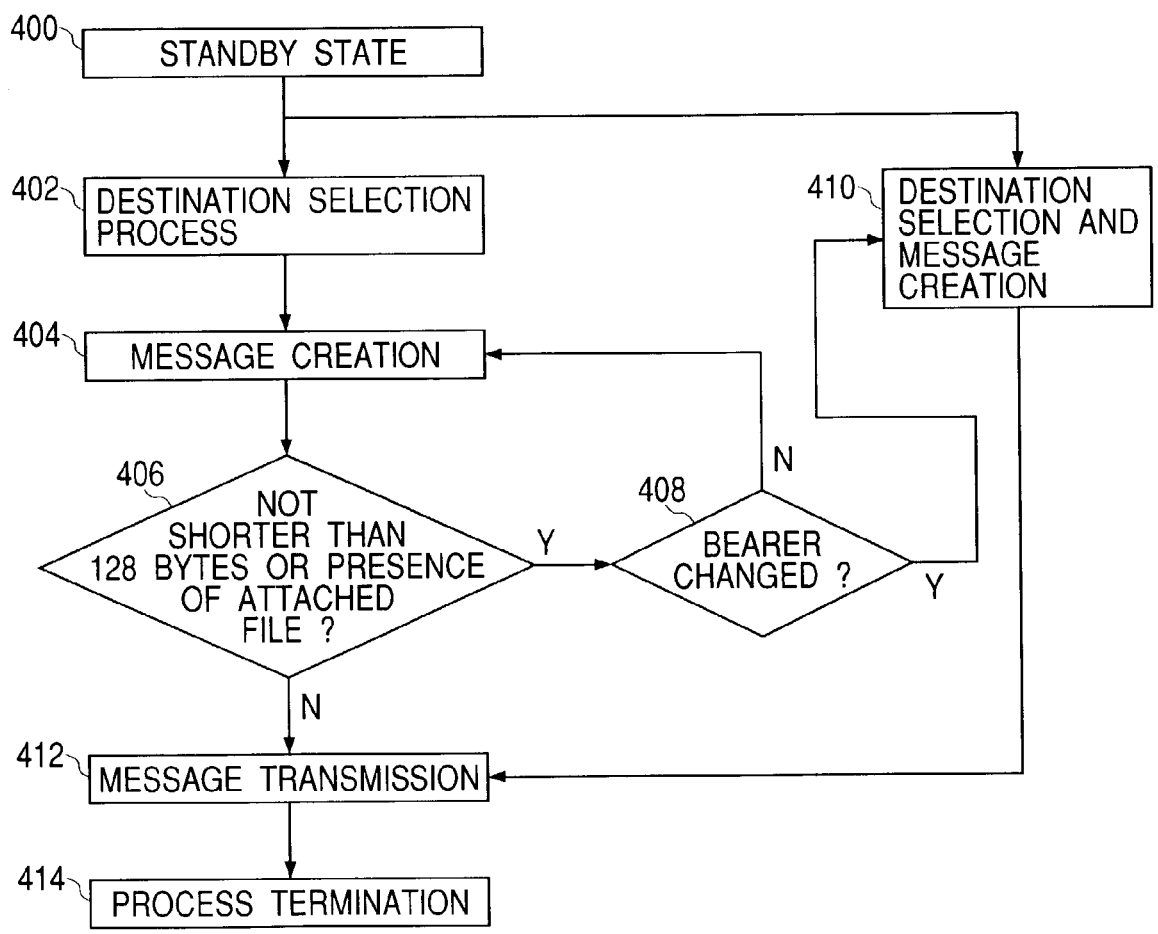
FIG. 4 is a flow chart illustrating a bearer changing function.
Figure 5:
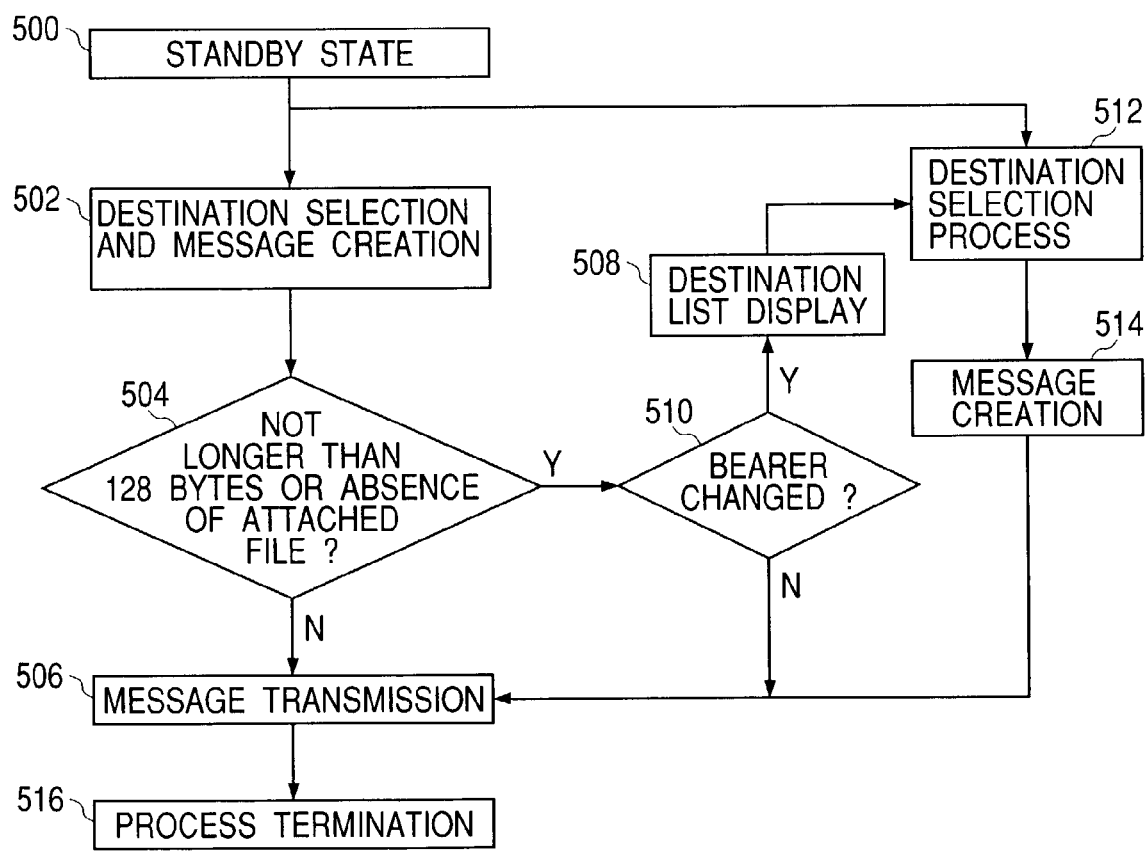
FIG. 5 is a flow chart illustrating a bearer changing function.
Figure 6:
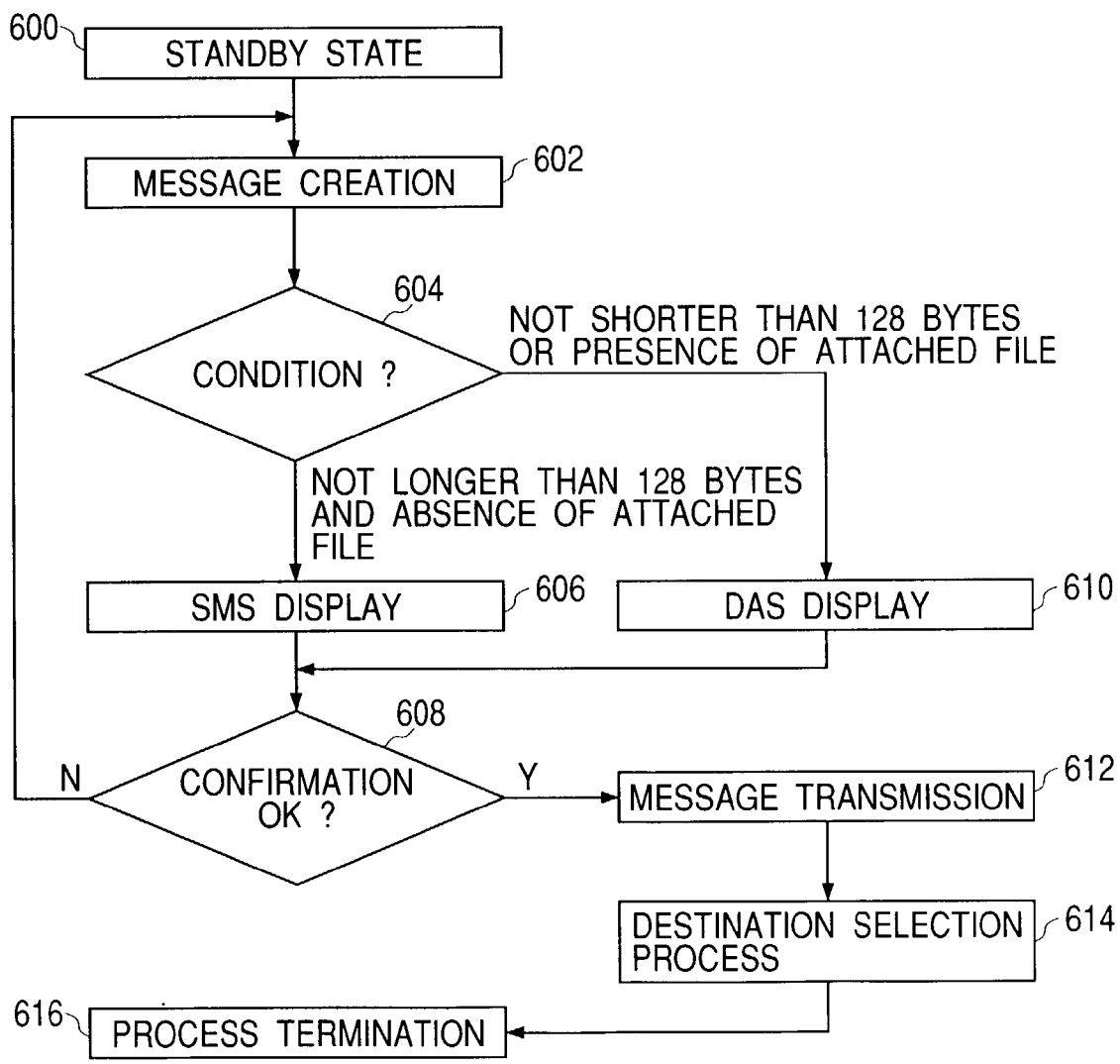
FIG. 6 is a flow chart illustrating a bearer automatic judging function according to an embodiment.

Next, with reference to FIGS. 1 to 4, a mobile communication terminal according to an embodiment of the invention will be described in detail. FIG. 1 is a functional block diagram showing the mobile communication terminal of the invention. FIG. 2 shows sequences illustrating two transmission methods. FIG. 3 shows the formats of signals used by the two transmission methods. FIGS. 4 to 6 are flow charts illustrating the operation of a mobile communication terminal to which the invention is applied.

As shown in FIG. 1, a mobile communication terminal of the invention has a CPU 101, a ROM 107, a RAM 109, a baseband unit 105, an RF unit 103, an antenna 125, a codec 115, a microphone (MIC) 117, a speaker (SP) 119, a display unit 111, keys 113, and a vibration motor 123. CPU 101 controls the whole of the mobile communication terminal.

The RF unit 103 transmits/receives a voice signal, a data signal (including message data), a control signal or the like via the antenna 125. The baseband unit 105 performs modulation/demodulation of signals to be transmitted/received. The codec 115 performs analog-digital conversion (A/D conversion) and digital-analog conversion (D/A conversion). MIC 117 corresponds to a voice input unit, and SP 119 corresponds to a voice output unit.

CPU 101 executes each function of the mobile communication terminal in accordance with a program written in ROM 107 and control signals supplied from the keys 113 and baseband unit 105. ROM 107 also stores system data such as terminal information. CPU 101 operates to store incoming/outgoing message data (incoming/outgoing message data history and incoming/outgoing message data), data registered or set by a telephone book function, and other data in RAM 109 connected to CPU 101. The vibration motor 123 vibrates the main frame of the mobile communication terminal to notify an incoming call. Specifically, if the user in public places such as trains does not want to reproduce audio sounds from the terminal, the vibration motor 123 is used to vibrate the main frame of the terminal to supply necessary information to the user.

The display unit 111 displays various information provided to the terminal, and the functions and setting items of the terminal. The keys 113 include dialing buttons for entering a telephone number of a partner telephone, an off-hook key and the like for calling and responding, and function keys for setting various functions.

FIG. 3(a) shows an SMS data format of signals to be transmitted/received by the SMS bearer. As shown in the upper row in FIG. 3(a), the data length of an SMS data block is 193 bytes. As shown in the middle row of FIG. 3(a), the SMS data block is constituted of an SMPT field of 62 bytes and a user user information field of 131 bytes at the maximum. The user user information field is constituted of a header field of 3 bytes and a user data field of 128 bytes at the maximum. The maximum size of message data of one session capable of transmitting/receiving by the SMS bearer is 128 bytes corresponding to the maximum length of the user user field, and a file cannot be attached.

FIG. 3(b) shows a DAS data format of signals to be transmitted/received by the DAS bearer. As shown in the upper row in FIG. 3(b), the data length of a DAS data block is 6144 bytes. As shown in the middle row of FIG. 3(b), the DAS data block has six DAS units each having 1024 bytes. The DAS unit has a header field DALP of 14 bytes, a user data field of 1009 bytes and a check sum CS field of one byte. The maximum size of message data of one session capable of transmitting/receiving by the DAS bearer is a sixfold of the user data field of 1009 bytes, i.e., 6054 bytes and a file can be attached.

The mobile communication terminal of the invention has two main functions, i.e., a bearer changing function of changing a bearer during or after the edition of message data and a bearer automatic judging function of automatically judging a bearer after the edition of message data.

In the following, the specific methods of realizing these functions will be described.

FIG. 4 is a flow chart illustrating a process of changing a bearer to the SMS bearer during the edition of message data. First, the SMS bearer is selected in the standby state before the edition of message data (Step 400). Next, a destination of the message data is selected (Step 402) and the message data is created (Step 404).

During the edition of message data, if it becomes certain that the sentence exceeds 128 bytes or a file is to be attached (Step 406), the user is prompted to change the bearer to the DAS bearer (Step 408). In other cases, a message data transmission process is executed (Step 412) to thereafter terminate the process (Step 414).

If the user instructs to change the bearer to the DAS bearer at Step 408, the operation transition is executed to set the destination and create the message data by the DAS bearer (Step 410). In this case, the destination and message data under the edition when the SMS bearer was selected are displayed in a destination setting area and a message creation area. At Step 412 the message data transmission process is executed in accordance with the usual transmission protocol of the DAS bearer to thereafter terminate the process (Step 414).

If the user does not instruct to change the bearer to the DAS bearer at Step 408, the message data creation process by the SMS bearer resumes (Step 404) to repeat the above-described processes.

FIG. 5 is a flow chart illustrating a process of changing a bearer from the DAS bearer to the SMS bearer after the edition of message data. First, the DAS bearer is selected in the standby state before the edition of message data (Step 500). Next, a destination of the message data is selected and the message data is created (Step 502).

After the edition of message data, the data size of the sentence and a presence/absence of a file to be attached are checked (Step 504). If the sentence is not longer than 128 bytes and a file is not attached, a screen for prompting the user to change the bearer to the SMS bearer (Step 510) is displayed. If the sentence is not shorter than 128 bytes or a file is to be attached, the message data transmission process is executed by the first selected DAS bearer (Step 506) to thereafter terminate the process (Step 516).

If the user instructs to change the bearer to the SMS bearer at Step 510, a destination list is displayed (Step 508) and the user selects a destination from this list and sets it (Step 512). The already created message data is displayed in the message creation area (Step 514). At Step 512 and following Steps, the message transmission process is executed in accordance with the usual transmission protocol of the SMS bearer (Step 506) to thereafter terminate the process (Step 516).

FIG. 6 is a flow chart illustrating a process of automatically judging a bearer after the edition of message data. First, the bearer is not selected when the flow enters the message data creation process (Step 602) from the standby state (Step 600). At the stage when the message data transmission process is executed after the edition of message data, it is judged whether the message data to be transmitted satisfies the transmission capability condition of which bearer (Step 604).

At Step 604 a message to the effect that it is proper to transmit by the DAS bearer is displayed if the data size is not shorter than 128 bytes or there is a file to be attached (Step 610), whereas a message to the effect that it is proper to transmit by the SMS bearer if the data size is not longer than 128 bytes and there is no file to be attached (Step 606).

It is confirmed whether the message data is transmitted by the displayed bearer (Step 608). If a user confirmation is OK, the message data transmission process is executed (Step 612) and the destination selection process is executed (Step 614) to thereafter terminate the process (Step 616). If the user confirmation is NG, the flow returns to the message data creation process (Step 602).

In FIG. 6, although the bearer judgement result is displayed to obtain a user confirmation (Step 608), an instant message transmission setting of ON/OFF may be provided, and if the instant message transmission setting is ON, the message data is transmitted without the user confirmation.

Figure 7:
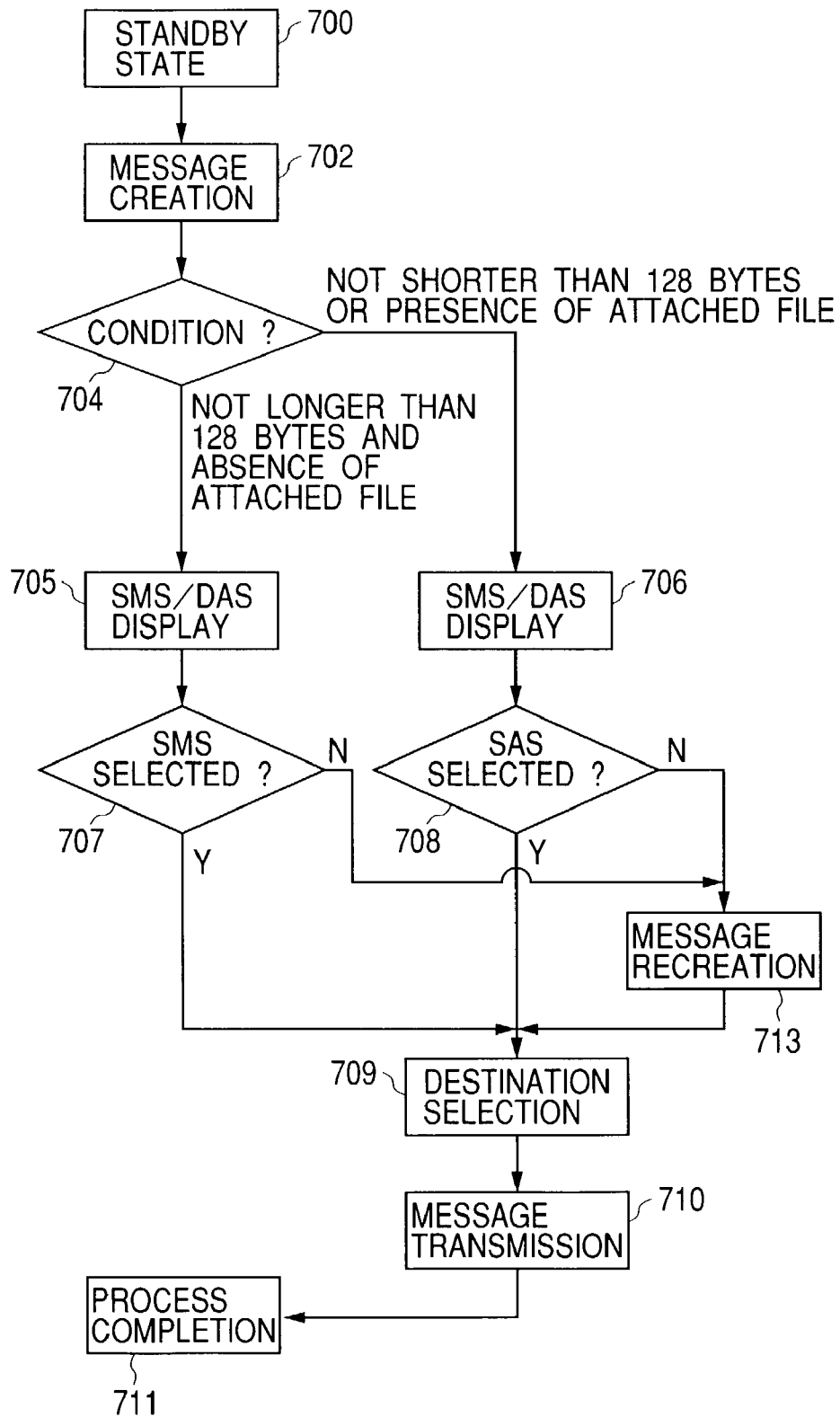
FIG. 7 is a flow chart illustrating a bearer automatic judging function according to another embodiment.
Figure 8:
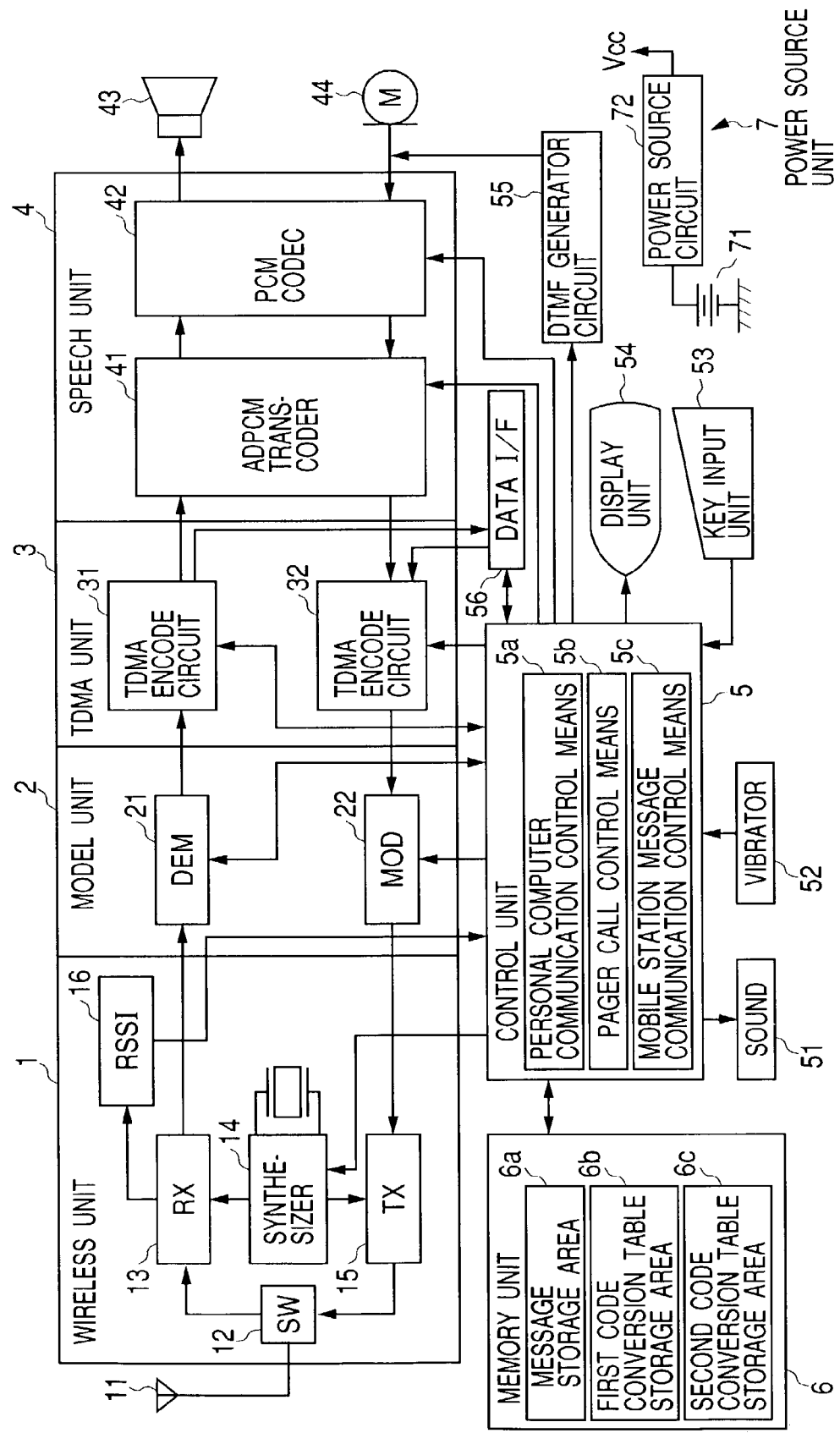
FIG. 8 is a functional block diagram showing the structure of a conventional mobile communication terminal.

FIG. 7 is another flow chart illustrating a process of automatically judging a bearer after the edition of message data. First, the bearer is not selected when the flow enters the message data creation process (Step 702) from the standby state (Step 700). At the stage when the message data transmission process is executed after the edition of message data, it is judged whether the message data to be transmitted satisfies the transmission capability condition of which bearer (Step 704).

At Step 704 it is judged whether the data size is not shorter than 128 bytes or there is a file to be attached, or whether the data size is not longer than 128 bytes and there is no file to be attached. In either case, the flow advances to next display Step 705 or 706. At the display Step, a selection screen for selecting either the SMS bearer or the DAS bearer for the message data transmission (Step 705 or 706) is displayed. The user selects either the SMS bearer or the DAS bearer. Next, it is judged whether the SMS bearer is selected (Step 707) because the data size judged at the preceding Step is not longer than 128 bytes, or whether the DAS bearer is selected (Step 708) because the data size judged at the preceding Step is not shorter than 128 bytes, and if the judgement is "YES", i.e., if the bearer corresponding to the judged data size is selected, the destination process is executed (Step 709) and the message data transmission process (Step 710) is executed to thereafter terminate the process (Step 711). If the bearer corresponding to the data size judged at Step 707 or 708 is not selected, a notice to the effect that the message data is to be created again is given to the user (Step 712), and the message creation process (Step 713) for the re-edition is executed to thereafter execute the destination process (Step 709).

The embodiments of the invention have been described above. The mobile communication terminal of the invention is not limited only to be above-described embodiments. For example, message data may be transmitted by a bearer different from the bearer judged as proper by the bearer automatic judging function. In this case, the user is notified of that the message data is transmitted by another bearer and of the particular limitation term (an attached file is deleted, and the like).

The bearer changing function and bearer automatic judging function may be automatically started up or manually started up by a user. To this end, valid/invalid setting is performed for each of the bearer changing function and bearer automatic judging function and may be registered. Registration of valid/invalid setting may be performed independently from speech partners or for each transmission partner.

These bearer changing function and bearer automatic judging function are applicable not only to newly created messages but also to transfer messages and return messages.

In the above description, the data size of message data and presence/absence of an attached file are used as bearer judging criterion. It is obvious that other terms may be used as the judgement criterion.

INDUSTRIAL APPLICABILITY

According to the invention, it is possible to provide a mobile communication terminal capable of selecting or changing a transmission method for transmitting message data to a partner terminal of the same kind during or after the edition of message data.

It is also possible to provide a mobile communication terminal capable of automatically judging a transmission method for transmitting message data to a partner terminal of the same kind after the edition of message data.

What is claimed:

1. A mobile communication terminal which can transmit data to a partner communication terminal provided with data transmission/reception services identical or compatible with the mobile communication terminal, by selecting any one of a plurality of transmission methods, the mobile communication terminal comprising:
   means for initially establishing any one of a plurality of bearers which correspond to the plurality of transmission methods, respectively;
   means, contained in the terminal, for creating and editing message data for transmission to the partner communication terminal;
   bearer changing means, contained in the terminal, for changing a transmission method;
   means for comparing an amount of the created message data with a predetermined threshold during or after edition of the message data;
   means for presenting a prompt before a user to cause the user to decide whether the initially established bearer should be changed to another bearer on the basis of a result of comparison by the comparing means and for accepting an instruction for bearer chance from the user; and
   means adapted to operate in such a way that if the bearer chance is instructed by the user, the initially established bearer is changed to another bearer to perform the data transmission using a transmission method corresponding to the other bearer, and if the bearer change is not instructed by the user, (i) when the amount of the created message data exceeds the predetermined threshold, an operation of the mobile communication terminal is transferred to a state wherein message data is to be edited again, and (ii) when the amount of the created message data is equal to or less than the predetermined threshold, the data transmission is performed using a transmission method corresponding to the initially established bearer.

2. The mobile communication terminal according to claim 1, wherein each of said bearer changing means and said bearer automatic judging means includes means for setting valid/invalid of an operation function of each of said bearer changing means and said bearer automatic judging means.

3. The mobile communication terminal according to claim 2, wherein said valid/invalid setting means includes means for registering the setting of valid/invalid of said bearer changing means and said bearer automatic judging means, for each transmission partner.

4. The mobile communication terminal according to claim 1, 2 or 3, further comprising means for setting or changing a destination in accordance with the transmission method selected or changed by said bearer changing means and said bearer automatic judging means, if the destination to be designated as a transmission destination of message data is different for each transmission method.

5. The mobile communication terminal according to any one of claims 1 to 3, wherein the message data is any one or a set of ones of a newly created message, a transfer message and a return message.

6. A control method for controlling a mobile communication terminal which has a bearer changing function and a bearer automatic judging function and can transmit data to a partner communication terminal provided with data transmission/reception services identical or compatible with the mobile communication terminal, by selecting any one of a plurality of transmission methods, said control method comprising the steps of:

initially establishing any one of a plurality of bearers which correspond to the plurality of transmission methods, respectively;

creating and editing in the terminal message data for transmission to the partner communication terminal;

comparing an amount of the created message data with a predetermined threshold during or after edition of the message data;

presenting a prompt before a user to cause the user to decide whether the initially established bearer should be changed to another bearer on the basis of a result of comparison by the comparing step and for accepting an instruction for bearer change from the user; and operating in such a way that if the bearer change is instructed by the user, the initially established bearer is changed to another bearer to perform the data transmission using a transmission method corresponding to the other bearer, and if the bearer change is not instructed by the user, (i) when the amount of the created message data exceeds the predetermined threshold, an operation of the mobile communication terminal is transferred to a state wherein message data is to be edited again, and (ii) when the amount of the created message data is equal to or less than the predetermined threshold, the data transmission is performed using a transmission method corresponding to the initially established bearer.

7. The method for controlling a mobile communication terminal according to claim 6, wherein said judging step includes monitoring whether the contents of message data during edition satisfies a transmission capability condition of the transmission method selected before the edition, wherein a new indicative of re-selection for transmission methods is displayed on said display unit if it is confirmed that the transmission capability condition is not satisfied; and wherein the transmission selected before the edition is changed to a re-selected transmission method if the transmission method is re-selected, or the operation of the mobile communication terminal is transferred to the state that message data is to be edited again, if the transmission method is not re-selected.

8. The method for controlling a mobile communication terminal according to claim 6, wherein said judging step includes deciding whether the contents of message data after edition satisfies a transmission capability condition of the transmission method selected before the edition, wherein it is judged whether the transmission capability condition of another transmission method is satisfied, if it is judged that the transmission capability condition is satisfied;

wherein a menu indicative of changeability to the other transmission method is displayed on said display unit, if the transmission capability condition of the other transmission method is also satisfied; and wherein a current transmission method is not changed if there is no instruction to change to the other transmission method, or the current transmission method is changed to the other transmission method if there is an instruction to change to the other transmission method.

9. The method for controlling a mobile communication terminal according to claim 6, wherein the displaying step including displaying on the display unit a selection menu to cause to select either message data transmission by the judged transmission method or message data transmission by another transmission method, said control method further comprising the steps of:

transmitting the data by the judged transmission method if the data transmission by the judged transmission method is selected, or notifying the user of that data is transmitted by the other transmission method and that message data is to be edited again in accordance with a transmission capability condition of the other transmission method, if the data transmission by the other transmission method is selected;

editing the message data again in accordance with the transmission capability condition of the other transmission method; and transmitting the re-edited message data.

10. The method for controlling a mobile communication terminal according to any one of claims 6 to 9, wherein the message data is any one or a set of ones of a newly created message, a transfer message and a return message.

11. The method for controlling a mobile communication terminal according to any one of claims 6 to 9, wherein the contents of the data include a data size of the message data and information concerning presence/absence of a file to be attached.

* * * * *